(12) United States Patent
Liu

(10) Patent No.: US 11,727,634 B2
(45) Date of Patent: Aug. 15, 2023

(54) INTELLIGENT POSITION SENSING SYSTEM BASED ON SPATIAL THREE-DIMENSIONAL MODEL IMAGE MATCHING

(71) Applicant: China University of Mining and Technology, Beijing, Beijing (CN)

(72) Inventor: Yi Liu, Beijing (CN)

(73) Assignee: CHINA UNIVERSITY OF MINING AND TECHNOLOGY, BEIJING, Beijing (CN)

( * ) Notice: Subject to any disclaimer, the term of this patent is extended or adjusted under 35 U.S.C. 154(b) by 260 days.

(21) Appl. No.: 17/313,419

(22) Filed: May 6, 2021

(65) Prior Publication Data

US 2021/0390736 A1   Dec. 16, 2021

(30) Foreign Application Priority Data

May 8, 2020 (CN) .......................... 202010380691.8

(51) Int. Cl.
| | |
|---|---|
| *G06T 17/05* | (2011.01) |
| *G06T 7/73* | (2017.01) |
| *H04W 4/021* | (2018.01) |
| *G06V 20/64* | (2022.01) |
| *G06F 18/22* | (2023.01) |

(52) U.S. Cl.
CPC .............. *G06T 17/05* (2013.01); *G06F 18/22* (2023.01); *G06T 7/75* (2017.01); *G06V 20/647* (2022.01); *H04W 4/021* (2013.01)

(58) Field of Classification Search
CPC ....... G06T 17/05; G06T 7/75; G06T 2200/28; G06T 2207/30244; G06T 2207/30252; G06T 7/74; G06F 18/22; G06V 20/647; H04W 4/021; H04W 64/00; H04W 4/33
See application file for complete search history.

(56) References Cited

U.S. PATENT DOCUMENTS 10,878,278 B1 * 12/2020 Cheriyadat ........... G06T 15/205

FOREIGN PATENT DOCUMENTS

WO    WO-2016066987 A1 *  5/2016   ........... G01C 21/206

* cited by examiner

*Primary Examiner* — Brandon J Miller
(74) *Attorney, Agent, or Firm* — Calderon Safran & Cole PC

(57) ABSTRACT

The present disclosure discloses an intelligent position sensing system based on spatial three-dimensional model image matching, which realizes three-dimensional precise positioning and target orientation positioning of closed spaces, such as a coal mine. The position sensing system includes a three-dimensional GIS server, a position matching server, a wireless camera, and a wireless access device. Position sensing is realized by comparing an image collected by the wireless camera with a two-dimensional image generated by rendering. The disclosure positions a target without carrying a special wireless positioning card, and can realize three-dimensional precise positioning, including target orientation, by only carrying a camera with a wireless communication function in combination with a wireless positioning technology, a three-dimensional GIS technology, and a digital image processing technology, which can be widely applied to the field of precise positioning of confined spaces, such as factories, coal mines, and subways, and can be widely applied and promoted.

9 Claims, 5 Drawing Sheets

INTELLIGENT POSITION SENSING SYSTEM BASED ON SPATIAL THREE-DIMENSIONAL MODEL IMAGE MATCHING

CROSS REFERENCE TO RELATED APPLICATION(S)

This patent application claims the benefit and priority of Chinese Patent Application No. 202010380691.8, filed on May 8, 2020, the disclosure of which is incorporated by reference herein in its entirety as part of the present application.

TECHNICAL FIELD

The present disclosure relates to an intelligent position sensing system based on spatial three-dimensional model image matching. The method relates to the fields of three-dimensional image rendering, artificial intelligence, geographical information systems, communications, etc.

BACKGROUND ART

At present, the positioning of moving targets in open spaces is mainly based on satellite positioning, including GPS, GLONASS, GALILEO, and Beidou Navigation Systems. In addition, positioning technologies based on cellular mobile communication systems, Wifi networks, and wireless sensor networks, are also applied. However, the positioning based on the cellular mobile communication systems is generally used for service management of communication operators only and does not provide personal positioning service for users. The positioning based on the Wifi networks and the wireless sensor networks can only realize the positioning in local area scopes. Therefore, the satellite positioning is still a main positioning technology in people's lives. However, the satellite positioning needs to be used when the sky is not covered, so its application conditions are greatly limited. Moreover, when a satellite fails or satellite positioning service is shut down, the positioning cannot be performed, which will cause great impact.

Satellite signals cannot be received in closed spaces, such as building interiors, tunnels, subway stations, and coal mines, so satellite positioning technologies cannot be used. RFID card identification and radio signal positioning technologies were mainly used in early positioning in the closed spaces. The RFID identification performs non-contact two-way communication in a radio frequency mode, so the identification and position monitoring of a moving target can be realized without contact between a radio frequency card and a card reader. The positioning based on the RFID identification belongs to a regional positioning technology, which can only identify whether a downhole moving target passes through a certain area, but cannot perform precise positioning on the moving target in the area. The radio signal positioning technologies perform positioning based on RSSI of transmission signal attenuation or transmission time of radio signals in a space. The radio signals are easily affected by the sizes and shapes of downhole spaces, space wall roughness, obstacles, etc. during transmission, and a radio signal attenuation model is extremely complex, so a positioning error reaches more than 10 m. The positioning precision of the positioning system based on radio signal transmission time is higher than that of an RSSI positioning system. However, the radio signal transmission time is affected by a multipath effect, a non-line-of-sight propagation delay, clock synchronization, clock timing errors, etc., so the positioning precision is difficult to ensure in an environment with many obstacles. In addition, positioning methods of RFID, RSSI, time of arrival (TOA), time difference of arrival (TDOA), etc. are all based on a ranging positioning principle. The orientation of a target cannot be positioned under a static condition.

Therefore, a three-dimensional precise positioning system which is suitable for closed space environments, such as a coal mine, is simple and efficient, low in construction cost, and high in positioning precision, and meanwhile, and can realize the target orientation of the target under a static condition is desired.

SUMMARY

1. With the development of GIS systems, three-dimensional modeling, and rendering technologies, the application of three-dimensional GIS technologies and systems are greatly promoted. The present disclosure provides an intelligent position sensing system based on spatial three-dimensional model image matching in combination with a wireless positioning technology, a three-dimensional GIS technology, and a digital image processing technology, which realizes three-dimensional precise positioning and target orientation positioning in closed space environments, such as a coal mine. The system includes a three-dimensional GIS server, a position matching server, a wireless camera, and a wireless access device. The wireless camera is carried by a moving target, and accesses to a communication network through the fixedly installed wireless access device. The three-dimensional GIS server stores three-dimensional geographic information data, and can render to generate a two-dimensional image according to the stored data. The position matching server is responsible for comparing the image collected by the wireless camera with the two-dimensional image generated by the three-dimensional GIS server to realize position sensing. Specific position sensing steps of the system include:

(1) the wireless camera and the wireless access device perform handshake communication; the position matching server determines the distance d between the wireless camera and the wireless access device according to the signal strength or signal time of arrival of the wireless communication between the wireless camera and the wireless access device, and determines a two-dimensional position area S of the wireless camera with reference to a known position where the wireless access device is fixed;

(2) the three-dimensional GIS server renders to obtain multiple two-dimensional images by taking multiple different positions in the two-dimensional position area S determined in step (1) as viewpoints and taking multiple different directions as view angles, and transmits the two-dimensional images and their position and direction data to the position matching server;

(3) the wireless camera collects an environment image, and transmits the image to the position matching server;

(4) the position matching server processes the image received in step (3);

(5) the position matching server compares the image obtained in step (4) with all two-dimensional images received in step (2), obtains similarity values respectively, and determines the two-dimensional image with the highest similarity value;

(6) the position matching server determines a matching result according to the highest similarity value obtained in step (5), determines that the matching is successful if the highest similarity value is greater than a set threshold value, and continues executing step (7) by taking the two-dimensional image with the highest similarity value as a target two-dimensional image; otherwise, the position matching server determines that the matching is not successful, and returns to execute step (1);

(7) the position matching server obtains the position and direction of the wireless camera according to the position and direction data related to the target two-dimensional image obtained in step (6).

2. The position sensing system further includes that: the three-dimensional geographic information data stored in the three-dimensional GIS server includes model data of appearance shapes and sizes, surface materials, surface colors, and surface identifiers of all solid objects in a position sensing area of the system.

3. The position sensing system further includes that: the two-dimensional position area S of the wireless camera in position sensing step (1) is an annular area S1 enclosed by the circles which take the position (x1, y1) of the wireless access device as a circle center and take d−E and d+E as radiuses on a horizontal plane at the installation height of the wireless camera, i.e., the area satisfies $$S = S_1 = \begin{cases} (x-x_1)^2 + (y-y_1)^2 \geq d-E \\ (x-x_1)^2 + (y-y_1)^2 \leq d+E \end{cases},$$

where E is a wireless communication ranging error between the wireless camera and the wireless access device.

4. The position sensing system further includes that: for the environment where more than one wireless access device is fixedly installed in a communication range of the wireless camera, the two-dimensional position area S of the wireless camera is an intersection area of the areas Si determined by each wireless access device according to claim 3; n wireless access devices are arranged, then $S=S_1 \cap S_2 \cap \ldots \cap S_n$.

5. The position sensing system further includes that: the viewpoint positions of the position sensing step (2) are the intersection point positions of square grid lines which take set positioning precision m as a side length in the two-dimensional position area S of the wireless camera on a horizontal plane at the installation height of the wireless camera.

6. The position sensing system further includes that: the view angles in the position sensing step (2) are the directions which take due north as 0° and have included angles of $\alpha = i \cdot \theta$ on the horizontal plane at the installation height of the wireless camera, where i=0, 1, 2, . . . , n, $$n < \frac{360}{\theta},$$

n is an integer, and θ is the precision of a set positioning angle; the view angles further include the view angles which have included angles of $\beta = j \cdot \theta$ with the horizontal plane at the installation height of the wireless camera and have the projections of α on the horizontal plane, where $|\beta|<90°$, |j|=1, 2, . . . , k, and $$k < \frac{90}{\theta}.$$

7. The position sensing system further includes that: the data stored in the three-dimensional GIS server further includes a two-dimensional spatial real scene image corresponding to the three-dimensional geographic information; the position matching server is responsible for comparing the image collected by the camera with the two-dimensional spatial real scene image to realize position sensing.

8. The position sensing system further includes that: the image processing methods in the position sensing step (4) include: filtering, edge enhancement, brightness adjustment, contrast adjustment, hue adjustment, and saturation adjustment.

9. The position sensing system further includes that: the image comparison method of the position sensing step (5) includes matching degree comparison or feature recognition and comparison.

The present disclosure achieves the beneficial effects that: the present disclosure performs position sensing in combination with the wireless positioning technology, the three-dimensional GIS technology, and the digital image processing technology. The target is positioned without carrying a special wireless positioning card, and three-dimensional precise positioning, including target orientation, can be realized by only carrying the camera with the wireless communication function, such as intelligent hand-held devices, including mobile phones, tablet computers, etc. The system is simple in structure and easy to implement, can be widely applied to the field of precise positioning of closed spaces, such as hospitals, schools, libraries, factories, coal mines, and subways, and can be widely applied and promoted.

DETAILED DESCRIPTION OF THE EMBODIMENTS

The technical solutions in the embodiments of the present disclosure will be clearly and completely described herein below with reference to the accompanying drawings in the embodiments of the present disclosure. Apparently, the described embodiments are merely part rather than all of the embodiments of the present disclosure. All other embodiments obtained by a person of ordinary skill in the art based on the embodiments of the present application without creative efforts shall fall within the protection scope of the present application.

Figure 1:
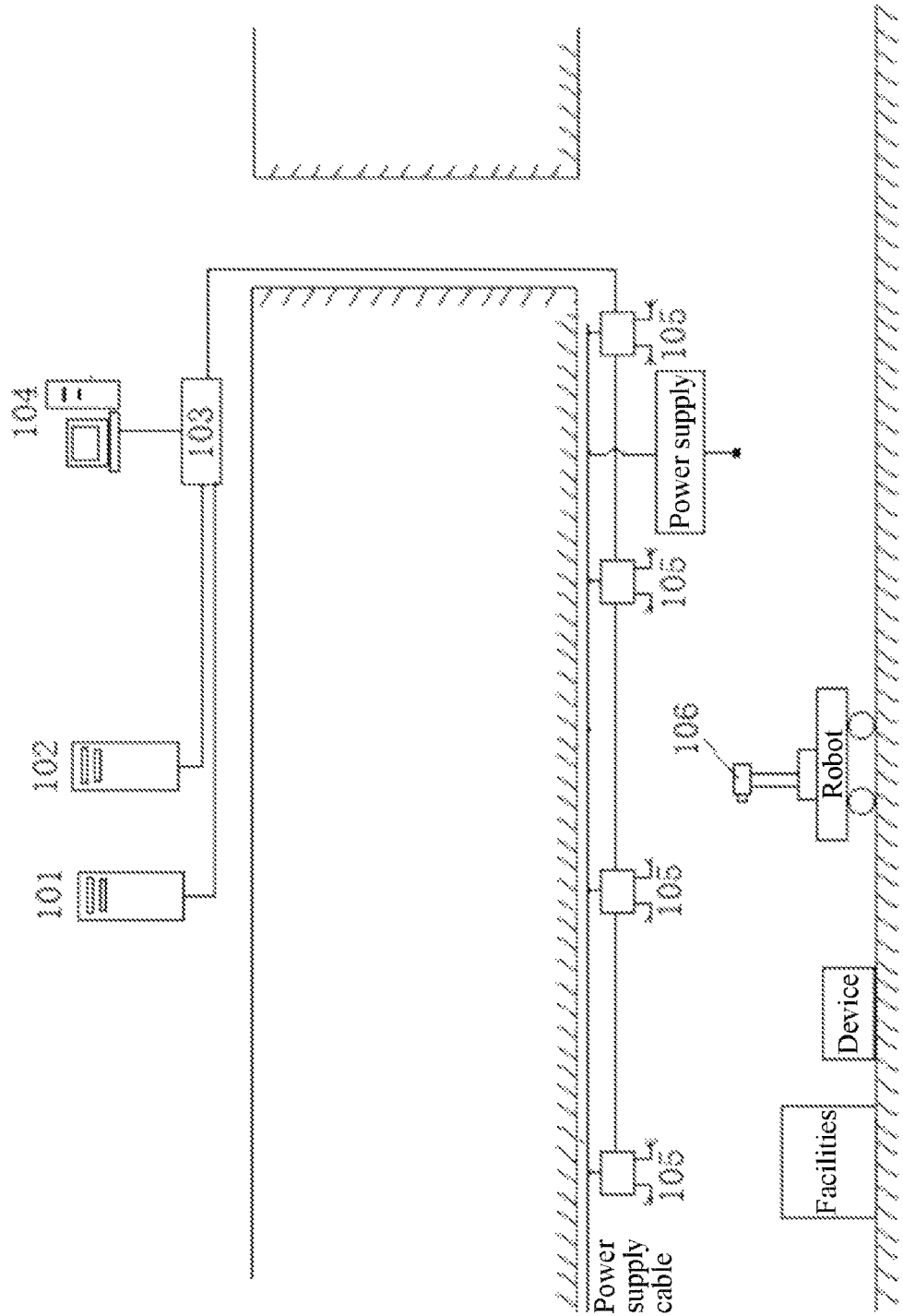
FIG. 1 is a schematic diagram of an example of application of an intelligent position sensing system based on spatial three-dimensional model image matching in a mine.

FIG. 1 is a schematic diagram of application of an intelligent position sensing system based on spatial three-dimensional model image matching in a mine. As shown in FIG. 1, the position sensing system in the present embodiment includes:

1. A three-dimensional GIS server (101), which stores three-dimensional geographic information. A general global positioning system of the three-dimensional geographic information is a coordinate system. The stored data includes model data of appearance shapes and sizes, surface materials, surface colors, and surface identifiers of all solid objects in a position sensing area of the system. Specific to the present example, the stored data includes spatial models of roadways and working faces, models of downhole equipment and facilities, etc. The data stored in the three-dimensional GIS server further includes position information of a wireless access device. The three-dimensional GIS server is also provided with a three-dimensional modeling and rendering engine, which is used for rendering a two-dimensional image in a position sensing area according to the model data. The three-dimensional modeling and rendering engine can use a data processing core engine of three-dimensional modeling software, such as 3DMAX. The three-dimensional GIS server can also store a two-dimensional spatial real scene image corresponding to the three-dimensional geographic information.

2. A position matching server (102), which is responsible for comparing the image collected by a wireless camera with the two-dimensional image generated by the three-dimensional GIS server to realize position sensing. The position matching server also has a function of positioning the wireless camera. The position matching server obtains the distance between the wireless camera and the wireless access device by acquiring data of signal strength or time of arrival of the communication between the wireless access device and the wireless camera from a wireless network management device (103) and processing the data, and determining a two-dimensional position area of the wireless camera according to the position data of the wireless access device provided by the three-dimensional GIS server. The position matching server can also realize position sensing by comparing the image collected by the wireless camera with the two-dimensional spatial real scene image stored in the three-dimensional GIS server.

3. The wireless network management device (103), which is used for unified management of the wireless access device, and can collect the data of the signal strength or the time of arrival of the communication between the wireless access device and the wireless camera.

4. A monitoring terminal (104), which is mainly responsible for the management of the three-dimensional GIS server, the position matching server, and the wireless network management device. Management personnel can access to above devices through the monitoring terminal, and manage device parameters and stored data. For example, the management personnel accesses to the three-dimensional GIS server to perform addition, deletion, modification, etc. on its geographic information data. According to application needs of the system, moving target monitoring software can be installed at the monitoring terminal to display a three-dimensional map and the image collected by the wireless camera and monitor the position of the moving target.

5. A wireless access device (105), i.e., an access device of a wireless network, which is responsible for accessing to the wireless network of the wireless communication device, including the wireless camera (106), and can monitor the signal strength or the signal time of arrival of the communication of the wireless camera.

6. The wireless camera (106), for example, a video and image collection device with a wireless commutation function, which is used for collecting an environment image and transmitting the image to the position matching server. In the Figure of the present example, the wireless camera is installed on a downhole robot. The image collecting range includes roadway walls, underground equipment, facilities, etc. The personnel who needs position sensing service can also take intelligent devices, such as mobile phones and tablet computers, with a wireless communication function as the wireless camera. If the intelligent device is installed with special navigation software, the three-dimensional map and its position can be displayed.

Figure 2:
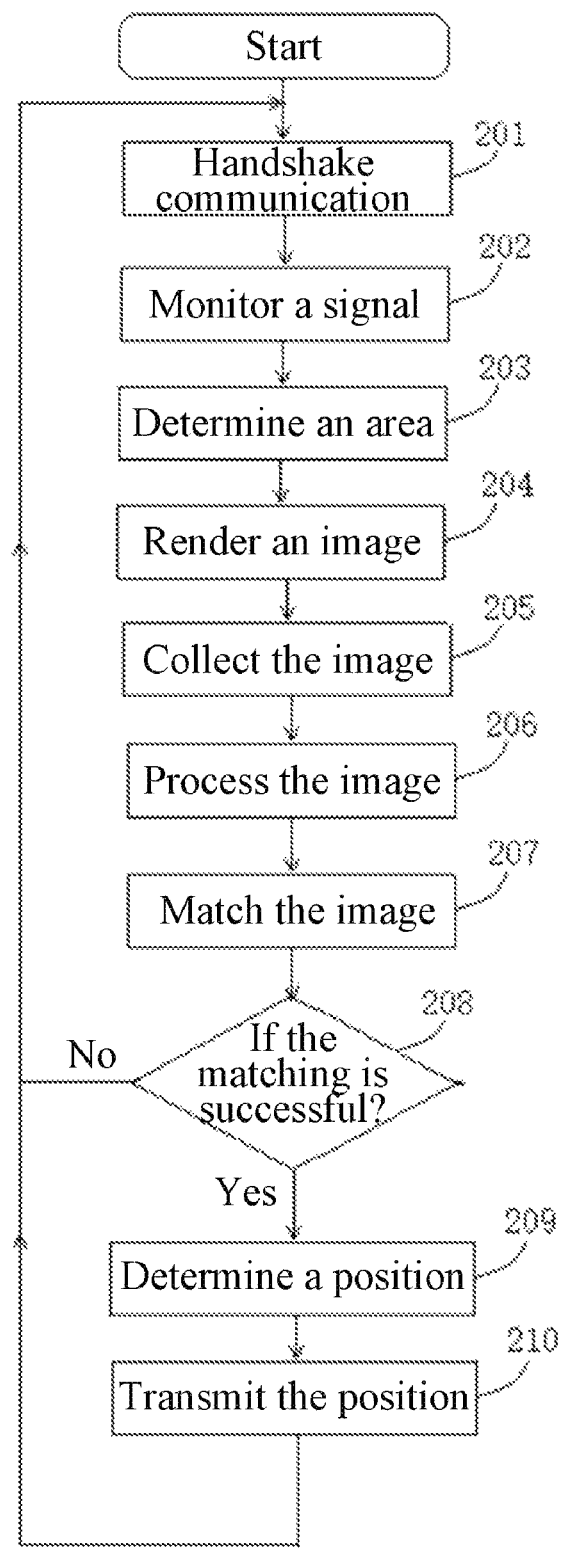
FIG. 2 is a position sensing flowchart of the intelligent position sensing system based on spatial three-dimensional model image matching.

A position sensing flowchart of the system is as shown in FIG. 2, including:

1. (201) The wireless camera and the wireless access device perform ranging communication.

2. (202) The wireless access device monitors the signal strength or the signal time of arrival of communication of the wireless camera.

3. (203) The position matching server determines the distance d between the wireless camera and the wireless access device according to the signal strength or the signal time of arrival of the wireless communication between the wireless camera and the wireless access device, determines a two-dimensional position area S of the wireless camera with reference to a known position where the wireless access device is fixed, and transmits the data of the two-dimensional position area to the three-dimensional GIS server.

4. (204) The three-dimensional GIS server renders to obtain multiple two-dimensional images by taking multiple different positions in the two-dimensional position area S as viewpoints and taking multiple different directions as view angles, and transmits the two-dimensional images and their position and direction data to the position matching server.

5. (205) The wireless camera collects an environment image, and transmits the image to the position matching server.

6. (206) The position matching server processes the image received in (205). The processing methods include: filtering, edge enhancement, brightness adjustment, contrast adjustment, hue adjustment, and saturation adjustment.

7. (207) The position matching server compares the image obtained in (206) with all two-dimensional images received in (205), obtains similarity values respectively, and determines the two-dimensional image with the highest similarity value.

8. (208) The position matching server determines a matching result, i.e., determines that the matching is successful if the highest similarity value is greater than a set threshold value, and executes (209) by taking the two-dimensional image with the highest similarity value as a target two-dimensional image; otherwise, the position matching server determines that the matching is not successful, and returns to (201).

9. (209) The position matching server obtains the position and direction of the wireless camera according to the position and direction data related to the target two-dimensional image obtained in (208).

10. (210) The position matching server transmits the position and direction of the wireless camera obtained in (209) to a monitoring terminal that needs position monitoring service, or an intelligent device that needs position navigation service, and returns to (201).

Figure 3:
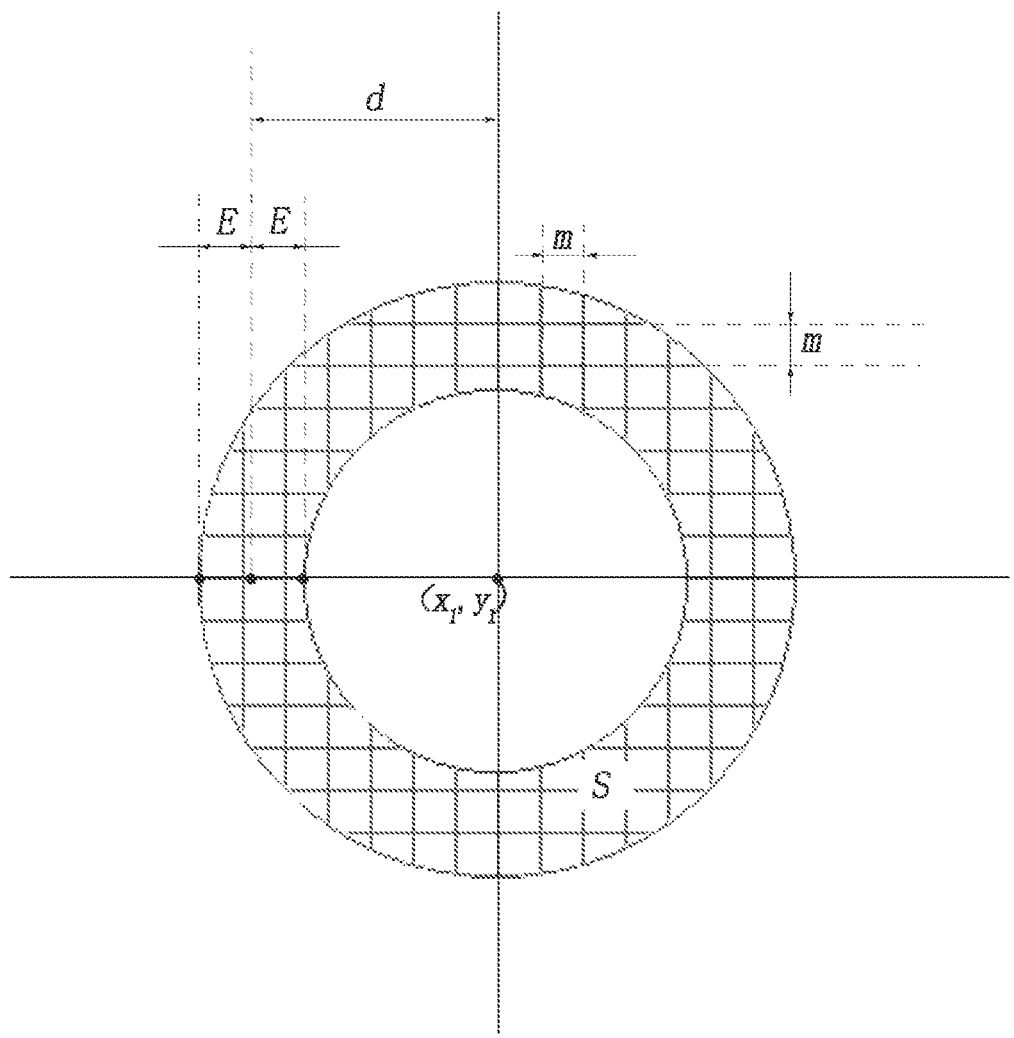
FIG. 3 is a schematic diagram of viewpoint positions of a rendered two-dimensional image under the condition of a single wireless access device.

FIG. 3 is a schematic diagram of a viewpoint position of a rendered two-dimensional image under the condition of a single wireless access device. As shown in the Figure, in an annular area S enclosed by the circles which take the position (x1, y1) of the wireless access device as a circle center and take d−E and d+E as radiuses, i.e., the area satisfies $$S = S_1 = \begin{cases} (x-x_1)^2 + (y-y_1)^2 \geq d-E \\ (x-x_1)^2 + (y-y_1)^2 \leq d+E \end{cases},$$

the intersection points of square grid lines which take set positioning precision m as a side length are the viewpoint positions of the rendered two-dimensional image. Where, E is a wireless communication ranging error between the wireless camera and the wireless access device.

Figure 4:
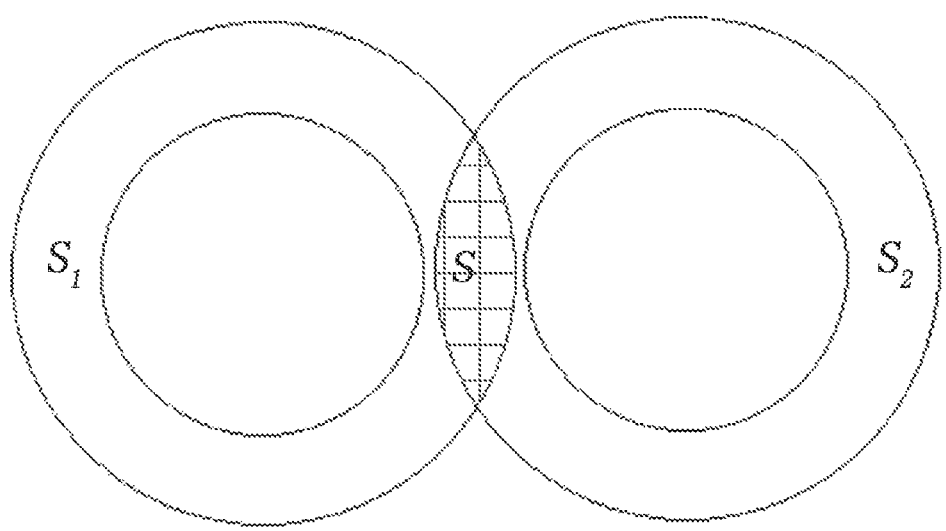
FIG. 4 is a schematic diagram of viewpoint positions of a rendered two-dimensional image under the condition of two wireless access devices.

FIG. 4 is a schematic diagram of a viewpoint position of a rendered two-dimensional image under the condition of two wireless access devices. As shown in the Figure, the rings which take the positions (x1, y1) and (x2, y2) of the two wireless access devices as circle centers are respectively S1 and S2, and the intersection area $S=S_1 \cap S_2 \cap \ldots \cap S_n$ of S1 and S2 is the two-dimensional position area of the wireless camera; in the area S, the intersection points of square grid lines which take set positioning precision m as a side length are the viewpoint positions of the rendered two-dimensional image.

Figure 5:
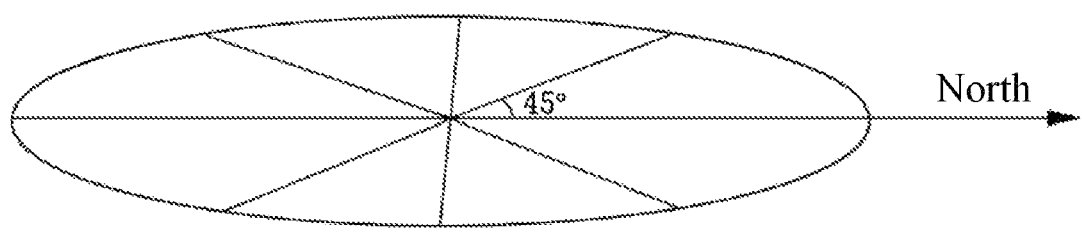
FIG. 5 is a schematic diagram of view angles of a rendered three-dimensional image based on a plane.

FIG. 5 is a schematic diagram of view angles of a rendered two-dimensional image based on a plane. As shown in the Figure, the view angles are the directions which take viewpoints as starting points of the view angles, take due north as 0°, and have included angles of $\alpha = i \cdot \theta$ on the horizontal plane at the installation height of the wireless camera, where i=0, 1, 2, . . . , n, $$n < \frac{360}{\theta},$$

n is an integer, and θ is the precision of a set positioning angle. In the present example, θ=45°, $$n = 7 < \frac{360}{45},$$

and α=0°, 45°,90°,135°,180°,225°,270°,315°.

Figure 6:
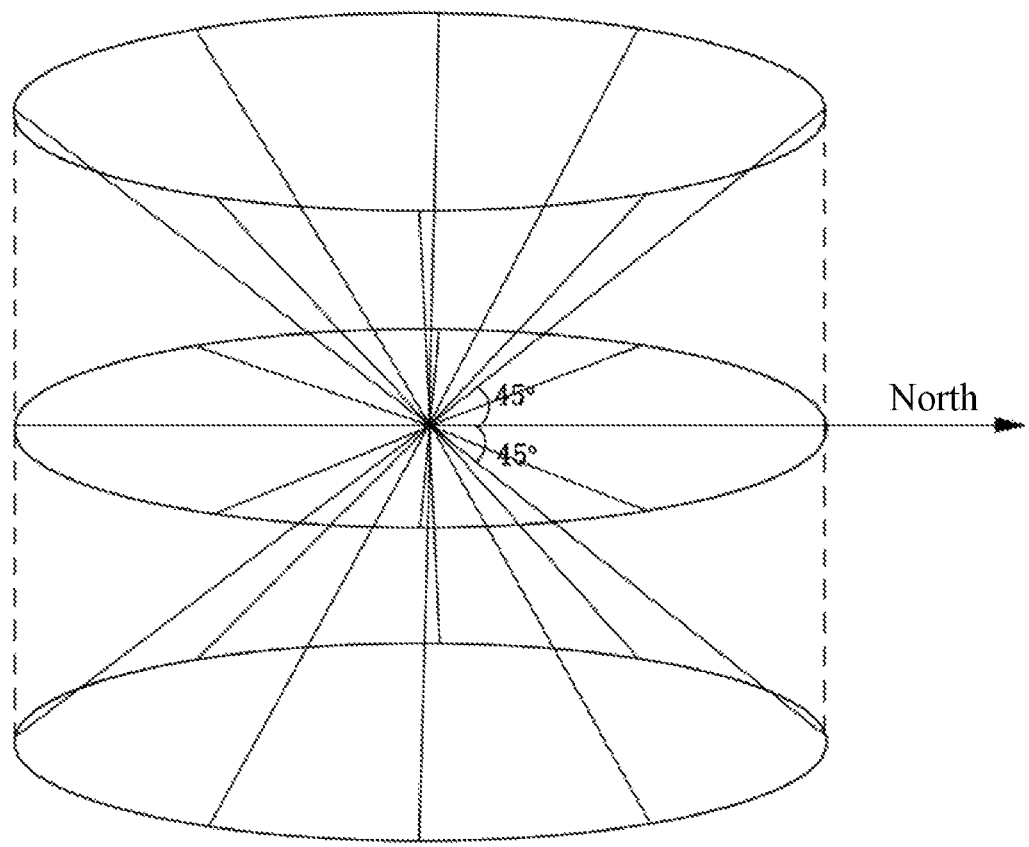
FIG. 6 is a schematic diagram of view angles of a rendered two-dimensional image based on a three-dimensional angle.

FIG. 6 is a schematic diagram of view angles of a rendered two-dimensional image based on a three-dimensional angle. As shown in the Figure, besides the plane view angles as shown in FIG. 5, the directions which have included angles of β with the horizontal plane at the installation height of the wireless camera are also added. In the directions with the projections of a on the horizontal plane, |β|=j·θ, where |β|<90°, |j|=1, 2, . . . , k, and $$k < \frac{90}{\theta}.$$

In the present example, k=1.

What is claimed is:
1. An intelligent position sensing system based on spatial three-dimensional model image matching, comprising a three-dimensional GIS (Geographic Information System) server, a position matching server, a wireless camera, and a wireless access device, wherein the wireless camera is carried by a moving target, and accesses to a communication network through the fixedly installed wireless access device; the three-dimensional GIS server stores three-dimensional geographic information data, and can render to generate a two-dimensional image according to the stored data; the position matching server is responsible for comparing the image collected by the wireless camera with the two-dimensional image generated by the three-dimensional GIS server to realize position sensing; specific position sensing steps of the system comprise:
  (1) performing, by the wireless camera and the wireless access device, handshake communication; determining, by the position matching server, the distance d between the wireless camera and the wireless access device according to the signal strength or signal time of arrival of the wireless communication between the wireless camera and the wireless access device, and determining a two-dimensional position area S of the wireless camera with reference to a known position where the wireless access device is fixed;
  (2) rendering, by the three-dimensional GIS server, to obtain multiple two-dimensional images by taking multiple different positions in the two-dimensional position area S determined in step (1) as viewpoints and taking multiple different directions as view angles, and transmitting the two-dimensional images and their position and direction data to the position matching server;
  (3) collecting, by the wireless camera, an environment image, and transmitting the image to the position matching server;
  (4) processing, by the position matching server, the image received in step (3);
  (5) comparing, by the position matching server, the image obtained in step (4) with all two-dimensional images received in step (2), obtaining similarity values respectively, and determining the two-dimensional image with the highest similarity value;
  (6) determining, by the position matching server, a matching result according to the highest similarity value obtained in step (5), determining that the matching is successful if the highest similarity value is greater than a set threshold value, and continuing executing step (7) by taking the two-dimensional image with the highest similarity value as a target two-dimensional image; otherwise, determining that the matching is not successful, and returning to execute step (1);
  (7) obtaining, by the position matching server, the position and direction of the wireless camera according to the position and direction data related to the target two-dimensional image obtained in step (6).

2. The position sensing system according to claim 1, wherein the three-dimensional geographic information data stored in the three-dimensional GIS server comprises model data of appearance shapes and sizes, surface materials, surface colors, and surface identifiers of all solid objects in a position sensing area of the system.

3. The position sensing system according to claim 1, wherein the two-dimensional position area S of the wireless camera in step (1) in claim 1 is an annular area S1 enclosed by circles which take the position (x1, y1) of the wireless access device as a circle center and take d−E and d+E as radiuses on a horizontal plane at the installation height of the wireless camera, i.e., the area satisfies $$S = S_1 = \begin{cases} (x-x_1)^2 + (y-y_1)^2 \geq d-E \\ (x-x_1)^2 + (y-y_1)^2 \leq d+E \end{cases},$$

wherein E is a wireless communication ranging error between the wireless camera and the wireless access device.

4. The position sensing system according to claim 3, wherein for the environment where more than one wireless access device is fixedly installed in a communication range of the wireless camera, the two-dimensional position area S of the wireless camera is an intersection area of the areas Si determined by each wireless access device according to claim 3; n wireless access devices are arranged, then $S=S_1 \cap S_2 \cap \ldots \cap S_n$.

5. The position sensing system according to claim 1, wherein the viewpoint positions of step (2) in claim 1 are the intersection point positions of square grid lines which take set positioning precision m as a side length in the two-dimensional position area S of the wireless camera on a horizontal plane at the installation height of the wireless camera.

6. The position sensing system according to claim 1, wherein the view angles in step (2) in claim 1 are the directions which take due north as 0° and have included angles of $\alpha=i\cdot\theta$ on the horizontal plane at the installation height of the wireless camera, wherein i=0, 1, 2, ..., n, $$n < \frac{360}{\theta},$$

n is an integer, and $\theta$ is the precision of a set positioning angle; the view angles further comprise the view angles which have included angles of $\beta=j\cdot\theta$ with the horizontal plane at the installation height of the wireless camera and have the projections of $\alpha$ on the horizontal plane, wherein $|\beta|<90°$, $|j|=1, 2, \ldots, k$, and $$k < \frac{90}{\theta}.$$

7. The position sensing system according to claim 1, wherein the data stored in the three-dimensional GIS server further comprises a two-dimensional spatial real scene image corresponding to the three-dimensional geographic information; the position matching server is responsible for comparing the image collected by the camera with the two-dimensional spatial real scene image to realize position sensing.

8. The position sensing system according to claim 1, wherein the image processing methods in step (4) in claim 1 comprise: filtering, edge enhancement, brightness adjustment, contrast adjustment, hue adjustment, and saturation adjustment.

9. The position sensing system according to claim 1, wherein the image comparison method of step (5) in claim 1 comprises matching degree comparison or feature recognition and comparison.

* * * * *